(12) United States Patent
Watanabe et al.

(10) Patent No.: US 7,787,029 B2
(45) Date of Patent: Aug. 31, 2010

(54) IMAGING APPARATUS

(75) Inventors: Nobuyuki Watanabe, Yokohama (JP); Fumiyuki Shiratani, Sagamihara (JP); Noriyuki Iyama, Hachioji (JP); Shinichi Mihara, Tama (JP); Hiroyuki Minakata, Hachioji (JP)

(73) Assignee: Olympus Corporation, Tokyo (JP)

( * ) Notice: Subject to any disclaimer, the term of this patent is extended or adjusted under 35 U.S.C. 154(b) by 679 days.

(21) Appl. No.: 11/260,736

(22) Filed: Oct. 27, 2005

(65) Prior Publication Data

US 2006/0262974 A1  Nov. 23, 2006

(30) Foreign Application Priority Data

Oct. 29, 2004 (JP) .............................. 2004-316143

(51) Int. Cl.
*H04N 5/262* (2006.01)
*H04N 5/232* (2006.01)
*H04N 5/235* (2006.01)

(52) U.S. Cl. .............................. 348/240.1; 348/240.99; 348/240.2; 348/240.3; 348/211.9; 348/229.1

(58) Field of Classification Search ............ 348/240.1, 348/240.2, 240.3, 240.99, 347, 211.9, 208.6, 348/E5.055, 362, 229.1, 255
See application file for complete search history.

(56) References Cited

U.S. PATENT DOCUMENTS

| | | | | |
|---|---|---|---|---|
| 5,986,705 | A * | 11/1999 | Shibuya et al. | 348/362 |
| 6,757,013 | B2 * | 6/2004 | Matsuzaka | 348/240.1 |
| 6,876,386 | B1 * | 4/2005 | Ito | 348/240.1 |
| 6,970,201 | B1 * | 11/2005 | Neil | 348/335 |
| 6,982,755 | B1 * | 1/2006 | Kikuzawa | 348/241 |
| 7,046,290 | B2 * | 5/2006 | Nozaki | 348/350 |
| 7,057,651 | B2 * | 6/2006 | Niikawa | 348/240.1 |
| 7,062,162 | B2 * | 6/2006 | Asada | 396/60 |
| 7,113,209 | B2 * | 9/2006 | Asada | 348/240.1 |

(Continued)

FOREIGN PATENT DOCUMENTS

JP  6-339083 A  12/1994

(Continued)

OTHER PUBLICATIONS

Japanese Office Action dated Jun. 23, 2009 and English translation thereof issued in a counterpart Japanese Application No. 2006-245678.

*Primary Examiner*—Lin Ye
*Assistant Examiner*—Marly Camargo
(74) *Attorney, Agent, or Firm*—Frishauf, Holtz, Goodman & Chick, P.C.

(57) ABSTRACT

An imaging apparatus comprises an optical magnification changing mechanism which optically changes a magnification of an image, and an electronic magnification changing mechanism which reduces or expands a magnification with respect to image data by signal processing, the imaging apparatus providing a magnification-changed image according to a predetermined magnification based on the optical magnification changing mechanism and the electronic magnification changing mechanism. The optical magnification changing mechanism has at least two magnifications W and T (W<T) which are discrete each other, and has a switching mechanism which, when a predetermined magnification M (W<M<T) has been set, switches an image obtained by the magnification W and an expanding conversion using the electronic magnification changing mechanism and an image obtained by the magnification T and a reducing conversion using the electronic magnification changing mechanism.

12 Claims, 14 Drawing Sheets

U.S. PATENT DOCUMENTS

| | | | |
|---|---|---|---|
| 7,269,300 B2 * | 9/2007 | Braun et al. | 382/298 |
| 7,349,013 B2 * | 3/2008 | Kyuma | 348/240.1 |
| 7,362,966 B2 * | 4/2008 | Uchiyama | 396/60 |
| 7,379,248 B2 * | 5/2008 | Higashiyama et al. | 359/676 |
| 2003/0160886 A1 * | 8/2003 | Misawa et al. | 348/347 |
| 2004/0046884 A1 * | 3/2004 | Nakano et al. | 348/333.01 |
| 2004/0095485 A1 * | 5/2004 | Ueda et al. | 348/240.1 |
| 2004/0114257 A1 * | 6/2004 | Tanaka et al. | 359/819 |
| 2004/0189830 A1 * | 9/2004 | Pollard | 348/240.1 |
| 2005/0162534 A1 * | 7/2005 | Higashiyama et al. | 348/240.1 |
| 2008/0055429 A1 * | 3/2008 | Yoshida | 348/240.99 |

FOREIGN PATENT DOCUMENTS

| | | |
|---|---|---|
| JP | 10-42183 A | 2/1998 |
| JP | 2000-278592 A | 10/2000 |
| JP | 2000-295530 A | 10/2000 |
| JP | 2001-136436 A | 5/2001 |
| JP | 2002-249968 A | 9/2002 |
| JP | 2002-314868 A | 10/2002 |
| JP | 2002-341396 | 11/2002 |
| JP | 2003-283910 A | 10/2003 |
| JP | 2004-088166 | 3/2004 |

* cited by examiner

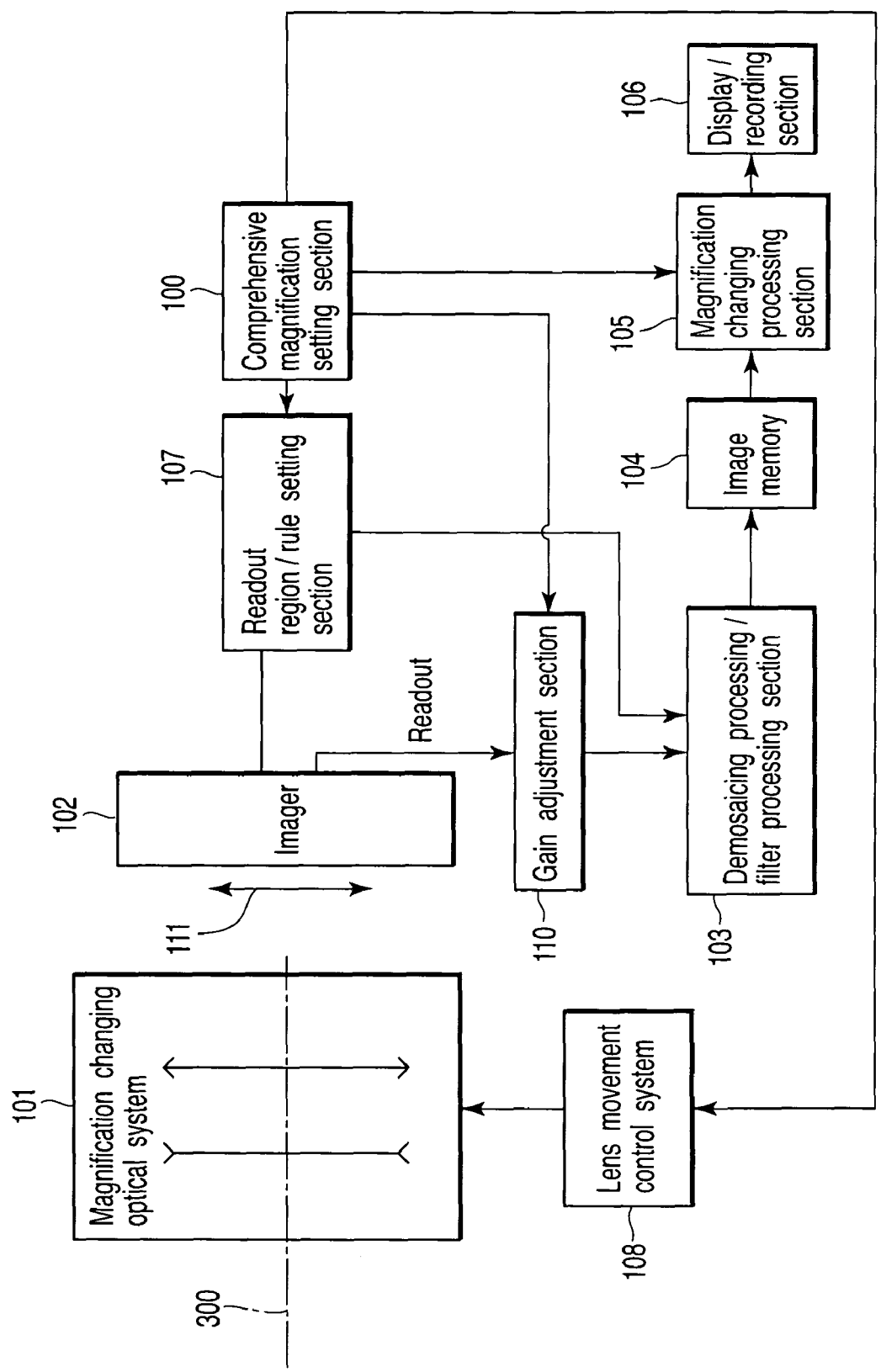
F I G. 1

| c1 | c2 | c3 | c4 | c5 | c6 | s1 | s2 | d1 | d2 | k1 | k2 | out |
|---|---|---|---|---|---|---|---|---|---|---|---|---|
| i0 | i1 | i2 | i3 | i4 | i5 | 0 | 0 | i2 | i4 | 1 | 0 | 1×i2 + 0×i4 |
| i1 | i2 | i3 | i4 | i5 | i6 | 0 | 0 | i3 | i5 | 5/6 | 1/6 | 5/6×i3 + 1/6×i5 |
| i2 | i3 | i4 | i5 | i6 | i7 | 0 | 0 | i4 | i6 | 5/6 | 1/6 | 5/6×i4 + 1/6×i6 |
| i3 | i4 | i5 | i6 | i7 | i8 | 0 | 0 | i5 | i7 | 3/4 | 1/4 | 3/4×i5 + 1/4×i7 |
| i4 | i5 | i6 | i7 | i8 | i9 | 1 | 1 | i4 | i6 | 1/6 | 5/6 | 1/6×i4 + 5/6×i6 |
| i5 | i6 | i7 | i8 | i9 | i10 | 1 | 1 | i5 | i7 | 1/12 | 11/12 | 1/12×i5 + 11/12×i7 |
| i6 | i7 | i8 | i9 | i10 | i11 | 0 | 0 | i8 | i10 | 1 | 0 | 1×i8 + 0×i10 |
| i7 | i8 | i9 | i10 | i11 | i12 | 0 | 0 | i9 | i11 | 5/6 | 1/6 | 5/6×i9 + 1/6×i11 |
| i8 | i9 | i10 | i11 | i12 | i13 | 0 | 0 | i10 | i12 | 5/6 | 1/6 | 5/6×i10 + 1/6×i12 |
| i9 | i10 | i11 | i12 | i13 | i14 | 0 | 0 | i11 | i13 | 3/4 | 1/4 | 3/4×i11 + 1/4×i13 |
| i10 | i11 | i12 | i13 | i14 | i15 | 1 | 1 | i10 | i12 | 1/6 | 5/6 | 1/6×i10 + 5/6×i12 |
| i11 | i12 | i13 | i14 | i15 | i16 | 1 | 1 | i11 | i13 | 1/12 | 11/12 | 1/12×i11 + 11/12×i13 |
| i12 | i13 | i14 | i15 | i16 | i17 | 0 | 0 | i14 | i16 | 1 | 0 | 1×i14 + 0×i16 |
| i13 | i14 | i15 | i16 | i17 | i18 | 0 | 0 | i15 | i17 | 5/6 | 1/6 | 5/6×i15 + 1/6×i17 |
| i14 | i15 | i16 | i17 | i18 | i19 | 0 | 0 | i16 | i18 | 5/6 | 1/6 | 5/6×i16 + 1/6×i18 |
| i15 | i16 | i17 | i18 | i19 | i20 | 0 | 0 | i17 | i19 | 3/4 | 1/4 | 3/4×i17 + 1/4×i19 |
| i16 | i17 | i18 | i19 | i20 | i21 | 1 | 1 | i16 | i18 | 1/6 | 5/6 | 1/6×i16 + 5/6×i18 |
| i17 | i18 | i19 | i20 | i21 | i22 | 1 | 1 | i17 | i19 | 1/12 | 11/12 | 1/12×i17 + 11/12×i19 |
| i18 | i19 | i20 | i21 | i22 | i23 | 0 | 0 | i20 | i22 | 1 | 0 | 1×i20 + 0×i22 |
| i19 | i20 | i21 | i22 | i23 | i24 | 0 | 0 | i21 | i23 | 5/6 | 1/6 | 5/6×i21 + 1/6×i23 |
| i20 | i21 | i22 | i23 | i24 | i25 | 0 | 0 | i22 | i24 | 5/6 | 1/6 | 5/6×i22 + 1/6×i24 |

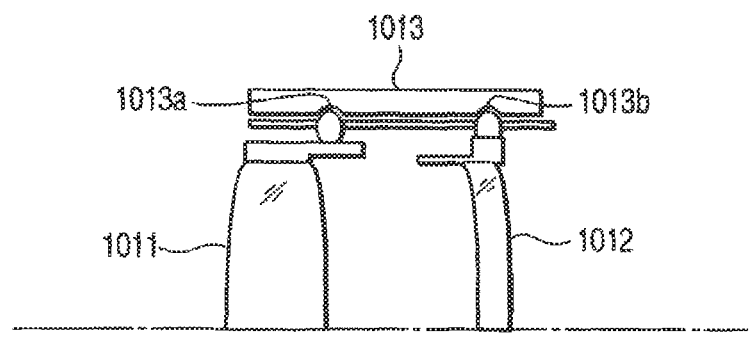
F I G. 1 9 A
PRIOR ART
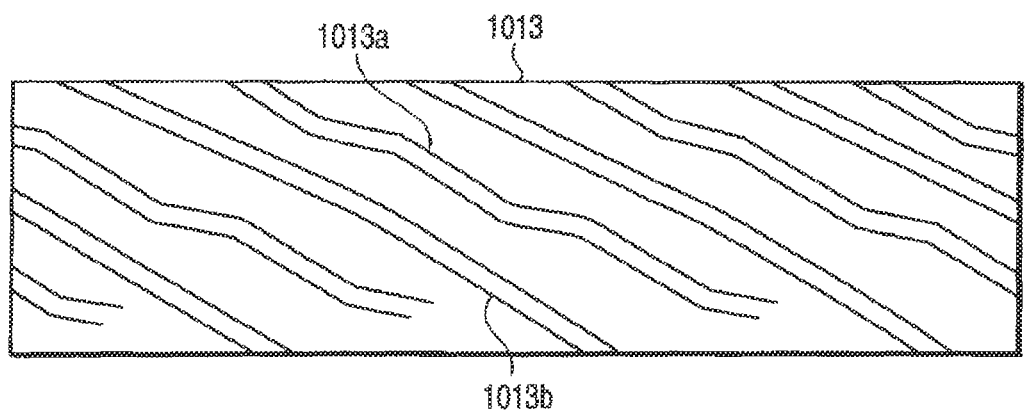
F I G. 1 9 B
PRIOR ART

IMAGING APPARATUS

CROSS-REFERENCE TO RELATED APPLICATIONS

This application is based upon and claims the benefit of priority from the prior Japanese Patent Application No. 2004-316143, filed Oct. 29, 2004, the entire contents of which are incorporated herein by reference.

BACKGROUND OF THE INVENTION

1. Field of the Invention

The present invention relates to an imaging apparatus comprising an optical magnification changing mechanism which optically changes a magnification of an image and an electronic magnification changing mechanism which reduces or expands a magnification with respect to image data by signal processing.

2. Description of the Related Art

In a video camera or a digital camera having a zoom lens system, a zoom ratio is changed by moving a zoom lens, whereby a focal distance is changed to a telephoto side or a wide-angle side while a focal position is kept constant, thereby changing an object distance. However, in configuring a small imaging element, optical zooming from the wide-angle side to the telephoto side changes not continuously but in a stepwise manner when a design is made such that a group number of lenses is decreased or when a design is made such that the number of actuators is reduced.

For example, let us consider an optical system having a two-group configuration in which a first group of lenses 301 is negative and a second group of lenses 302 is positive, as shown in FIG. 18, only the second group of lenses 302 at an image side being movable. In the case where a position of the movable lens 302 has been moved as indicated by an arrow 304 as illustrated, an image surface 303 changes in a curved shape as illustrated.

That is, in the case where, in a lens of such a type as shown in FIG. 18, an optical system has been designed such that a telephoto image is formed on an image surface at a certain zoom magnification (focal distance) A, there are only a maximum of two zoom magnifications including A such that the telephoto image is formed on the image surface. Similarly, there are only a maximum of two zoom magnifications such that an image is focused at a predetermined focal distance. However, since the number of lenses can be reduced and a drive section can be simplified, there is an advantage that stepwise zooming can be configured at a small size and at a low cost.

In addition, FIG. 19A shows a cam ring mechanism which is used to simplify a drive section of an optical zoom lens. FIG. 19B is an exploded schematic view of a cam ring provided at an interior wall of a mirror frame 1013 shown in FIG. 19A. In this case, a magnification changing lens 1011 and a focusing lens 1012 are driven in accordance with cam grooves 1013a and 1013b by rotation of the mirror frame 1013. In the illustrated example, there are three steps of stepwise zooming. In this case, since one cam ring can drive two groups of lenses, it is possible to reduce the number of actuators for driving. This technique contributes to downsizing of the imaging apparatus, as in the configuration shown in FIG. 18.

Although the above-described technique can contribute downsizing of the imaging apparatus by reducing the group number of lenses or simplifying a structure of the drive section, the number of steps of optical zooming is reduced due to its structure. As a result, there is a disadvantage that a user cannot obtain a desired configuration.

On the other hand, Jpn. Pat. Appln. KOKAI Publication No. 6-339083 discloses that magnifications of a two-focus optical system and an optical finder with a zoom are made coincident with each other by using a magnification changing process using an electron zoom (electronic magnification change). In addition, Jpn. Pat. Appln. KOKAI Publication No. 2003-283910 discloses that, in order to substantially match angles of view of an optical finder and imaging system while a drive control system of the optical finder and a stepwise zooming imaging lens is used in common, the stepwise zooming at a magnification, which does not exceed a magnification of the optical finder but is proximal thereto, is selected when the magnification is specified, and adjustment of an angle of view is carried out by electronic zooming. In Jpn. Pat. Appln. KOKAI Publication No. 2001-136436, a magnification changing process is carried out by using a technique of optical/electronic magnification change for canceling a fluctuation of an angel of view due to a change of a photography mode (still picture or motion picture).

On the other hand, in recent years, a video camera has incorporated an electronic zooming function for electronically changing an image magnification by using an imaging element other than such optical zooming. The electronic zooming function is a function of changing a focal distance to the telephoto side without moving a zoom lens so as to convert an imaging signal of size which is smaller than a light receiving screen size of the imaging element to a video signal which corresponds to the light receiving screen size. In a video camera having such an electronic zooming function, an imaging signal of size which is greater than the light receiving screen size of the imaging element cannot be obtained. For this reason, zooming to the wide-angle side has not be successfully achieved although zooming to the telephoto side can be achieved.

In contrast, there is proposed an apparatus and a method for substantially generating an image at the wide-angle side while fixing a lens by utilizing a difference between the number of pixels of the imaging element and the number of pixels of an output image. An imaging apparatus enabling such electronic zooming includes an imaging apparatus disclosed in Jpn. Pat. Appln. KOKAI Publication No. 2000-295530, for example. This publication discloses a solid state imaging apparatus having photoelectric conversion pixels arranged two-dimensionally, for randomly providing an access to the photoelectric conversion pixels, the apparatus comprising first skipping means for reading out an arbitrarily specified pixel and second skipping means for reading out an image region which is smaller than an image frame read out by the first skipping means, wherein the number of pixels read out by the first and second skipping means are made equal to each other.

Further, Jpn. Pat. Appln. KOKAI Publication No. 10-42183 discloses an imaging apparatus comprising: first adjusting means for optically changing an angle of view of an image; a second adjusting means for electrically changing an angle of view of an image; and control means for controlling the first adjusting means and the second adjusting means to determine an angle of view, wherein the control means has been configured to adjust an angle of view to a desired angle of view by the second adjusting means and substantially move the control of the angle of view from the second adjusting means to the first adjusting means while maintaining the angle of view. Specifically, the imaging apparatus disclosed in this publication uses a CCD type imaging element. When electronic zooming is carried out, all pixels are read out from the CCD type imaging element, and the read-out pixels are temporarily stored in a frame memory or the like. Then, an electrical interpolating process is carried out on the basis of a pixel signal relating to a small number of pixels included in a partial area of a full angle of view.

Jpn. Pat. Appln. KOKAI Publication No. 6-339083 discloses that magnifications of a two-focus optical system and an optical finder with a zoom are coincided with each other by using a magnification changing process with electronic zooming. Moreover, Jpn. Pat. Appln. KOKAI Publication No. 2002-314868 discloses an imaging apparatus using an imaging element which is capable of specifying a readout position and range on the imaging element by reading out a photoelectric conversion signal on the imaging element in accordance with an X-Y address system, and further, carrying out thinning-out readout based on the same number of clocks. There is disclosed that the imaging apparatus makes control by using electronic zooming means for carrying out electronic zooming for changing an isolation angle of view which is obtained as an isolation range of an imaging position and an imaging angle of view; and the electronic zooming and optical zooming in combination, whereby a zooming range of an output angle of view associated with a finally output image signal is controlled so as to be substantially wider than any of an optical zoom range which can be produced by only a change of the imaging angle of view and an electronic zoom range which can be produced by only a change of the isolation angle of view.

In addition, Japanese Patent Application No. 2002-249968 proposes a method of reducing distortion of an image obtained during readout with respect to distortion of an image caused by thinning-out readout by using spatial and temporal interpolation, and obtaining a high quality image, wherein a step width of the thinning-out readout can be finely produced to a certain degree.

BRIEF SUMMARY OF THE INVENTION

According to a first aspect of the present invention, there is provided an imaging apparatus having an imaging element which converts an optically formed image to an electrical signal by means of photoelectric conversion, thereby acquiring image data, the imaging apparatus comprising:

an optical magnification changing mechanism which optically changes a magnification of an image; and an electronic magnification changing mechanism which reduces or expands a magnification with respect to image data by signal processing, the imaging apparatus providing a magnification-changed image according to a predetermined magnification based on the optical magnification changing mechanism and the electronic magnification changing mechanism, wherein the optical magnification changing mechanism has at least two magnifications W and T (W<T) which are discrete each other, and has a switching mechanism which, when a predetermined magnification M (W<M<T) has been set, switches an image obtained by the magnification W and an expanding conversion using the electronic magnification changing mechanism and an image obtained by the magnification T and a reducing conversion using the electronic magnification changing mechanism.

According to a second aspect of the present invention, there is provided an imaging apparatus according to the first aspect, wherein the electronic magnification changing mechanism has an allowable range defined by an upper limit and a lower limit of a magnification specified by a resolution of an image.

According to a third aspect of the present invention, there is provided an imaging apparatus according to the second aspect, wherein, assuming that the allowable range of the electronic magnification changing mechanism is Z1 to Z2 (Z1<1.0<Z2) and a magnification in the vicinity of an actual switching magnification is Z3 or Z4 (Z1≦Z3<1.0<Z4<Z2), a resolution obtained by W×Z4 and a resolution obtained by T×Z3 are within a range of a predetermined difference with respect to the two magnifications W and T.

According to a fourth aspect of the present invention, there is provided an imaging apparatus according to the first aspect, wherein the switching mechanism changes a magnification of an image switching in response to a change rate when a magnification change is specified.

According to a fifth aspect of the present invention, there is provided an imaging apparatus according to claim 1, wherein the switching mechanism changes a magnification of an image switching in response to a change direction when a magnification change is specified.

According to a sixth aspect of the present invention, there is provided an imaging apparatus according to the first aspect, wherein, when a collimator value is C(W) or C(T) with respect to the two magnifications W and T, a change is provided to a gain obtained during electronic magnification changing processing such that a darker collimator value is gradually changed to a brighter collimator value when the dark collimator value is changed to the right collimator value in magnification change.

According to a seventh aspect of the present invention, there is provided an imaging apparatus having an imaging element which converts an optically formed image to an electrical signal by means of photoelectric conversion, thereby acquiring image data, the imaging apparatus comprising:

an optical magnification changing mechanism which optically changes a magnification of an image; and an electronic magnification changing mechanism which reduces or expands a magnification with respect to image data by signal processing, the imaging apparatus providing a magnification-changed image according to a predetermined magnification based on the optical magnification changing mechanism and the electronic magnification changing mechanism, wherein the optical magnification changing mechanism has at least two magnifications W and T (W<T) which are discrete each other, and has a switching mechanism which, when a predetermined magnification M (W<M<T) has been set, switches the image of the magnification W, the image of the magnification T, and an image obtained by a reducing conversion using the electronic magnification changing mechanism.

According to an eighth aspect of the present invention, there is provided an imaging apparatus according to the seventh aspect, wherein the electronic magnification changing mechanism has an allowable range defined by an upper limit and a lower limit of a magnification specified by a resolution of an image.

According to a ninth aspect of the present invention, there is provided an imaging apparatus according to the seventh aspect, wherein, assuming that the allowable range of the electronic magnification changing mechanism is Z1 to Z2 (Z1<1.0<Z2) and a magnification in the vicinity of an actual switching magnification is Z3 or Z4 (Z1<Z3<1.0<Z4<Z2), a resolution obtained by W×Z4 and a resolution obtained by T×Z3 are within the range of a predetermined difference with respect to the two magnifications W and T.

According to a tenth aspect of the present invention, there is provided an imaging apparatus according to the seventh aspect, wherein the switching mechanism changes a magnification of an image switching in response to a change rate when a magnification change is specified.

According to an eleventh aspect of the present invention, there is provided an imaging apparatus according to the seventh aspect, wherein the switching mechanism changes a magnification of an image switching in response to a change direction when a magnification change is specified.

According to a twelfth aspect of the present invention, there is provided an imaging apparatus according to the first aspect, wherein a reference of a resolution for specifying a range of magnifications of the electronic magnification changing mechanism is based on a spatial frequency response (SFR), and the reference of the resolution is obtained as a relative value standardized by an SFR value in the case where no process using the electronic magnification changing mechanism has been carried out.

According to a thirteenth aspect of the present invention, there is provided an imaging apparatus according to the seventh aspect, wherein a reference of a resolution for specifying a range of magnifications of the electronic magnification changing mechanism is based on a spatial frequency response (SFR), and the reference of the resolution is obtained as a relative value standardized by an SFR value in the case where no process using the electronic magnification changing mechanism has been carried out.

According to a fourteenth aspect of the present invention, there is provided an imaging apparatus according to the first aspect, wherein an interval of the magnifications of the optical magnification changing mechanism is set such that a resolution of an image generated by using the optical magnification changing mechanism and the electronic magnification changing mechanism is obtained as a reference value or more.

According to a fifteenth aspect of the present invention, there is provided an imaging apparatus according to the first aspect, wherein an interval of the magnifications of the optical magnification changing mechanism is set such that a resolution of an image generated by using the optical magnification changing mechanism and the electronic magnification changing mechanism is obtained as a reference value or more.

According to a sixteenth aspect of the present invention, there is provided an imaging apparatus according to the seventh aspect, wherein the electronic magnification changing mechanism carries out an interpolating process such that the number of pixels is increase with respect to a predetermined region of image data read out during an expanding process; discretely samples a wide region as compared with a readout region obtained by sampling provided in the case where no magnification change is made during a reducing process; and converts current data to predetermined image data in accordance with a correcting process.

According to a seventeenth aspect of the present invention, there is provided an imaging apparatus according to the first aspect, wherein the electronic magnification changing mechanism carries out an interpolating process such that the number of pixels is increase with respect to a predetermined region of image data read out during an expanding process; discretely samples a wide region as compared with a readout region obtained by sampling provided in the case where no magnification change is made during a reducing process; and converts current data to predetermined image data in accordance with a correcting process.

According to an eighteenth aspect of the present invention, there is provided an imaging apparatus according to the first aspect, wherein a total number of pixels read out from the imaging element for the purpose of the expanding process using the electronic magnification changing mechanism and a total number of pixels read out from the imaging element for the purpose of the reducing process using the electronic magnification changing mechanism are constant.

According to a nineteenth aspect of the present invention, there is provided an imaging apparatus according to the seventh aspect, wherein a total number of pixels read out from the imaging element for the purpose of the expanding process using the electronic magnification changing mechanism and a total number of pixels read out from the imaging element for the purpose of the reducing process using the electronic magnification changing mechanism are constant.

According to a twentieth aspect of the present invention, there is provided an imaging apparatus according to the first aspect, wherein the optical magnification changing mechanism discretely changes a magnification of an optical image by a mechanism which switches part of an optical path.

According to a twenty-first aspect of the present invention, there is provided an imaging apparatus according to the seventh aspect, wherein the optical magnification changing mechanism discretely changes a magnification of an optical image by a mechanism which switches part of an optical path.

According to a twenty-second aspect of the present invention, there is provided an imaging apparatus according to the first aspect, wherein the optical magnification changing mechanism makes a stepwise zooming operation and a focusing operation by means of a cam mechanism having a region for magnification change and a region for focusing.

According to a twenty-third aspect of the present invention, there is provided an imaging apparatus according to the seventh aspect, wherein the optical magnification changing mechanism makes a stepwise zooming operation and a focusing operation by means of a cam mechanism having a region for magnification change and a region for focusing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing a configuration of an imaging apparatus to which the present invention is applied;

FIG. 8 shows an operation (state transition) of a pipeline process of a filter processing section 142 shown in FIG. 4;

FIGS. 9A and 9B are views each schematically showing how a reference position is shifted within a readout range in repetitive readout of 6/8 thinning-out readout;

FIG. 19A is a view showing a cam ring mechanism which is used to simplify a drive section of an optical zoom lens; and FIG. 19B is an exploded schematic view of a cam ring provided on an interior wall of a mirror frame 1013 shown in FIG. 19A.

DETAILED DESCRIPTION OF THE INVENTION

Figure 2A:
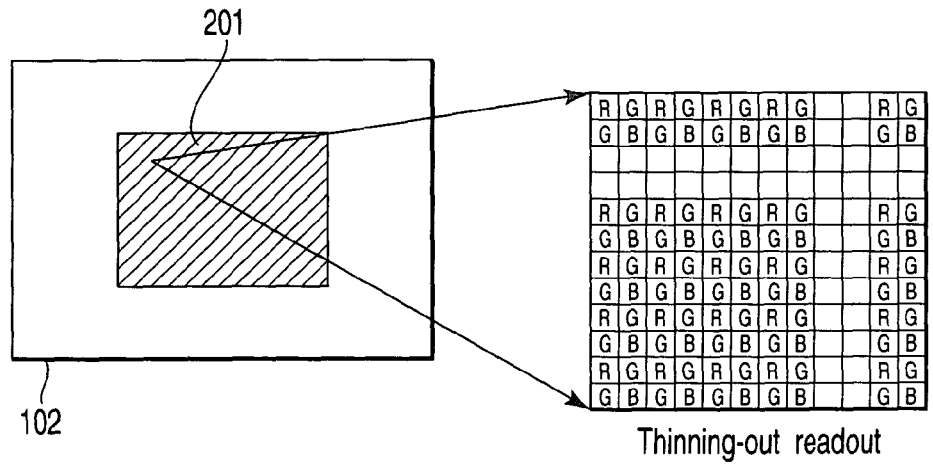
FIGS. 2A to 2C are views for explaining a sampling system and an electronic magnification change on an imager 102.

Hereinafter, one embodiment of the present invention will be described with reference to the accompanying drawings. FIG. 1 is a diagram showing a configuration of an imaging apparatus to which the present invention is applied. In FIG. 1, a light beam 300 having passed through a magnification changing optical system 101 is formed on an imager 102 serving as an imaging element. The imager 102 converts the optical image formed by photoelectric conversion to an electronic signal. Gain adjustment for the electrical signal is made at a gain adjustment section 110, and further, demosaicing process and filter process are carried out at a demosaicing processing/filter processing section 103. The filter process includes a distortion correction filter process for thinning-out readout as described later.

Further, an image signal is temporarily stored in an image memory (line memory) 104, and is subjected to a magnification changing process at a magnification changing processing section 105. A readout region/rule setting section 107 is a section which sets a readout region and a readout rule for image data. Here, the demosaicing processing/filter processing section 103, the magnification changing processing section 105, and the readout region/rule setting section 107 are mechanisms associated with an electronic magnification changing mechanism. A lens movement control system 108 is an optical magnification changing mechanism which makes lens movement control.

Furthermore, a comprehensive magnification setting section 100 is a section which determines a comprehensive magnification for providing an effective magnification-changed image. In accordance with a magnification, the comprehensive magnification setting section 100 controls settings of lens movement, a readout region, and a readout rule (thinning-out readout), a magnification (expanding process) of an image after imaged, and gain adjustment for compensating for, a change of brightness due to a change of an optical magnification. The comprehensive magnification determining section 100 also controls a change timing of the optical magnification changing mechanism and the electronic magnification changing mechanism in response to a change rate when a zoom change is specified. In addition, the comprehensive magnification determining section 100 discriminates a case in which zooming is moved in a telephoto direction and a case in which zooming is moved in a wide angle direction, and controls a change timing of the optical magnification changing mechanism and the electronic magnification changing mechanism.

Figure 2B:
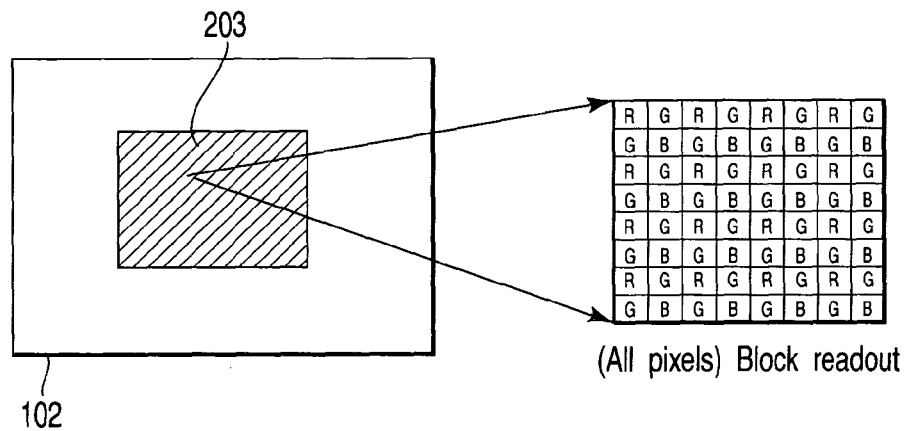
Figure 2C:
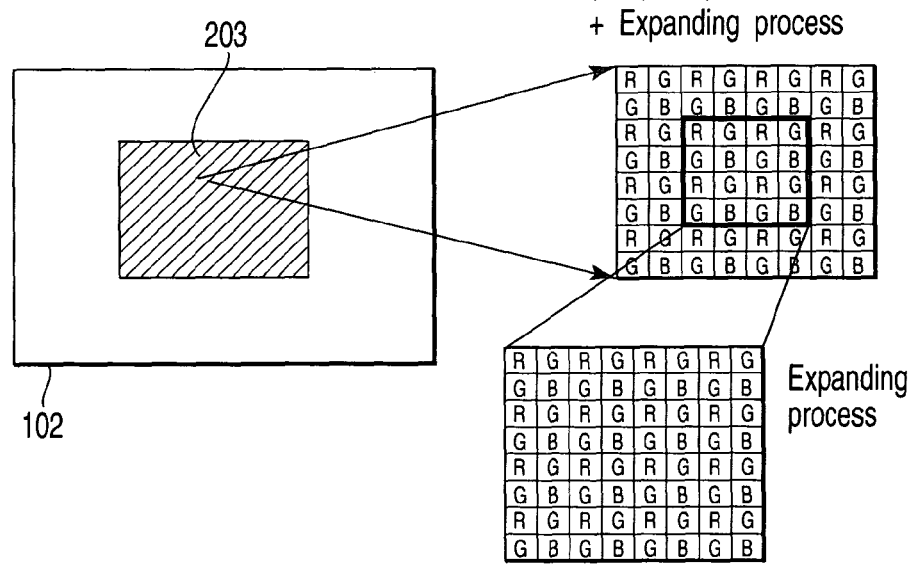

FIGS. 2A to 2C are views for explaining a magnification change using electronic zooming. FIG. 2A shows an example of a reduction process, FIG. 2B shows an example of full pixel readout, and FIG. 2C shows an example of an expansion process.

In the full pixel readout shown in FIG. 2B, all pixels of a region on the imager 102 are sampled, and an image is formed without carrying out electronic magnification change. In contrast, in the thinning-out readout shown in FIG. 2A, pixel data contained in a readout region 201 which is wider than a readout region 203 shown in FIG. 2B is read out by thinning-out readout, and an image of size which is equal to that shown in FIG. 2B is finally formed. Therefore, this implies that the reduction process is carried out in the sampling shown in FIG. 2A.

The filter processing section 103 shown in FIG. 1 carries out correction of image distortion or the like in the case where thinning-out readout has been carried out.

In the process shown in FIG. 2C, full pixel readout similar to that shown in FIG. 2B is carried out, and then, magnification change is made by the magnification changing section 105 shown in FIG. 1. An image of size which is equal to that of an image generated by carrying out full pixel readout is formed from a partial region of the image data obtained by the full pixel readout shown in FIG. 2B. Therefore, this implies that the expansion process is carried out in the process shown in FIG. 2C.

As described above, there are an expanding process and a reducing process when electronic magnification change is made. In the case where the reducing process is carried out, a region of a pixel number which is larger than that of an image output by the imager is acquired, and an output image is generated by a magnification changing process such as an interpolating process. In this case, a total clock number of the acquired pixels is different depending on the size of an area to be imaged. That is, as a magnification is closer to the wide-angle side, a large number of clocks are required. In other words, as long as there occurs a use situation such that no problem occurs even if the clock number or processing time of imaging for acquiring one screen changes due to an angle of view (zooming), there is no need for carrying out readout using pixel mixing or thinning-out readout. In contrast, it is possible to change only a width of a readout region without changing the number of clocks by using simultaneous readout of a plurality of pixels by means of thinning-out readout or pixel mixing.

Figure 3A:
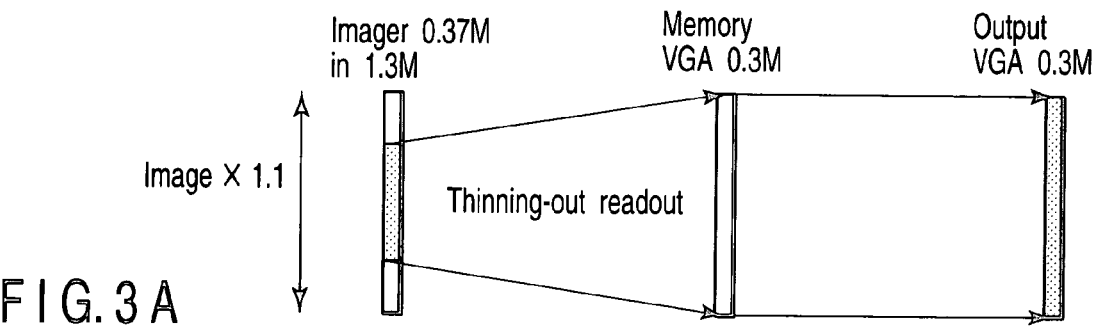
FIGS. 3A to 3C are views each showing how a magnification of an image is changed by electronic magnification change while an optical magnification is constantly maintained, thereby changing a final image magnification.
Figure 3B:
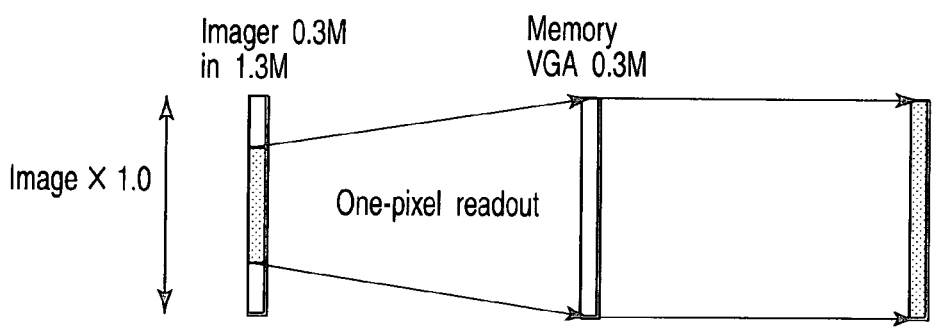
Figure 3C:
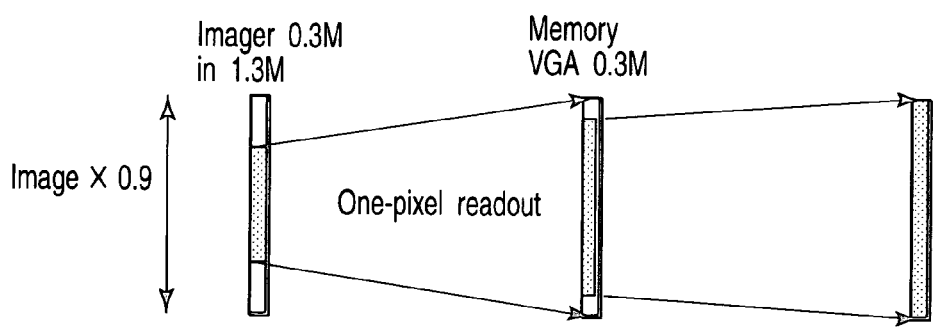

FIGS. 3A to 3C each show how a magnification of an image is changed by electronic zooming while an optical magnification is constantly maintained, thereby changing a final image magnification. FIG. 3A shows a method of storing and outputting pixels of 0.3 M (VGA) in a memory by means of thinning-out readout from pixels of 0.37 M in an imager of 1.3 M, wherein the current state corresponds to a wide angle (WIDE) state. FIG. 3B shows a method of reading out one pixel from pixels of 0.3 M in an imager of 1.3 M, and storing and outputting it in a memory as is. FIG. 3C shows a method of reading out one pixel from pixels of 0.3 M in an imager of 1.3 M, storing it in a memory, reading out data of 0.25 M therefrom, and expanding and outputting the data to 0.3 M, wherein the current state corresponds to a telephoto (TELE) state.

At this time, an expanding process using linear interpolation or the like is carried out for an image acquired once, and the magnification interval is interpolated. However, in electronic magnification change using the interpolating process, it is known that an image is degraded as is magnification increases. There is no problem as long as the expansion rate is 1 to 1.3 times as usual, but if an expanding process of 1.5 times to 2 times or more is carried out, image degradation becomes significant as compared with optical zooming.

In order to compensate for image degradation due to only the expanding process, a magnification change is made by means of thinning-out readout and distortion correcting process of the imager 102.

Figure 4:
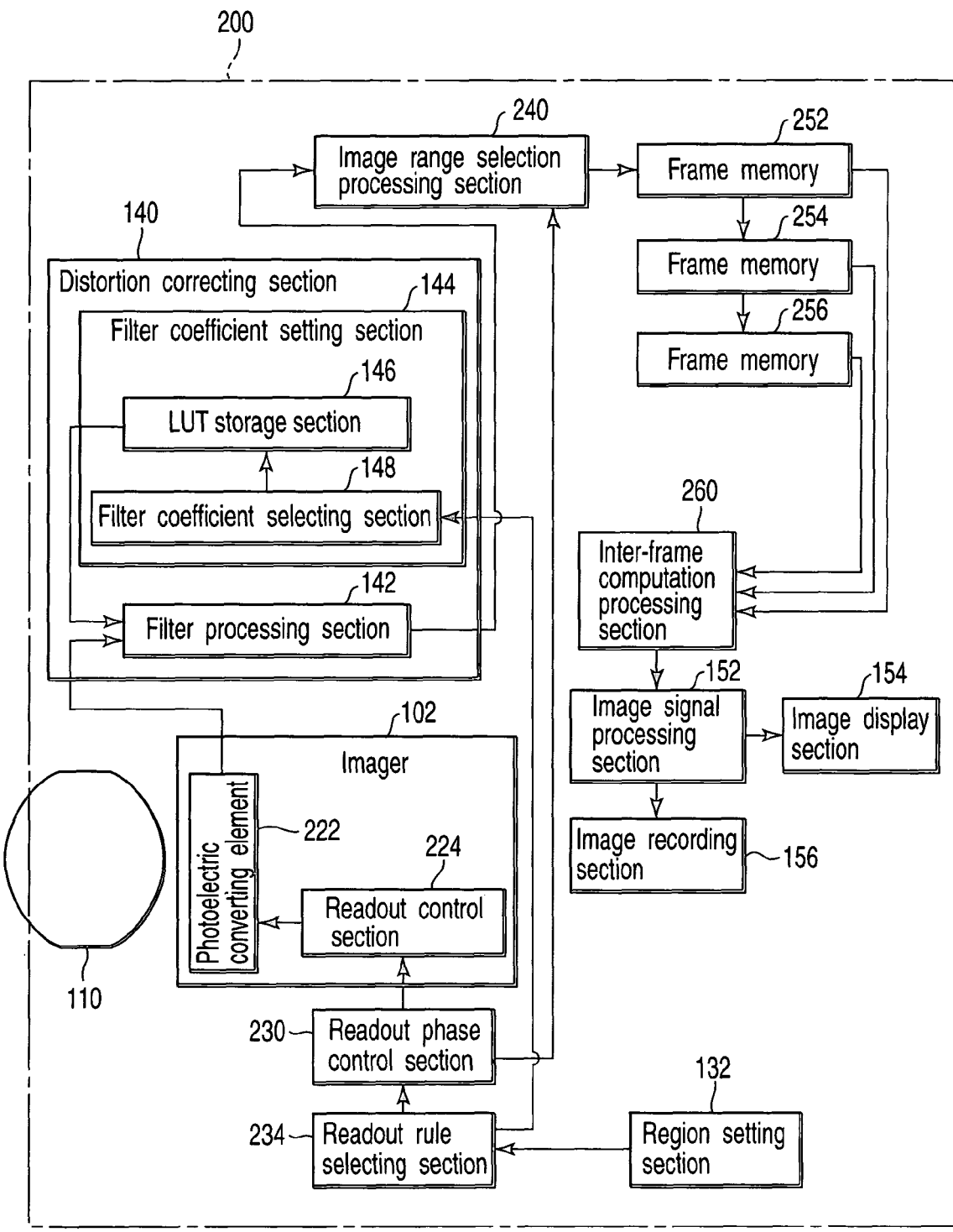
FIG. 4 is a diagram showing a configuration of an imaging apparatus 200 comprising a distortion thinning-out processing function after carrying out thinning-out readout of a pixel on the imager 102.

FIG. 4 shows a configuration of an imaging apparatus 200 comprising a distortion correcting function which carries out a distortion correcting process after carrying out thinning-out readout of pixels on the imager 102. The imaging apparatus 200 has: an electronic magnification changing mechanism 110 which forms an optical image of an object; and the imager 102 which outputs an image signal in a predetermined region of the optical image formed by the electronic magnification changing mechanism 110.

The imager 102 has an area-shaped photoelectric converting element 222 which photoelectrically converts the optical image formed by the optical magnification changing mechanism 101 to acquire digital image data (a set of pixel data); and a readout control section 224 which reads out by thinning-out the image data acquired by the photoelectric converting element 222 as required.

Further, a region setting section 132 sets which region of the imager 102 is output as an image. A readout rule selecting section 234 is a section which selects a readout rule on the basis of the set readout region. A readout phase control section 230 is a section which shifts a reference position of a range of pixel data read out by the readout control section 224.

Here, in the case where a difference is present between a size of an image to be output and a size of a region on the imager 102, the image on the imager 102 is read out by thinning-out, and further, is subjected to distortion correction by a distortion correcting process section 140. The distortion correcting section 140 has a filter coefficient setting section 144 and a filter processing section 142, the filter coefficient setting section 144 having a LUT storage section 146 and a filter coefficient selecting section 148.

Figure 5:
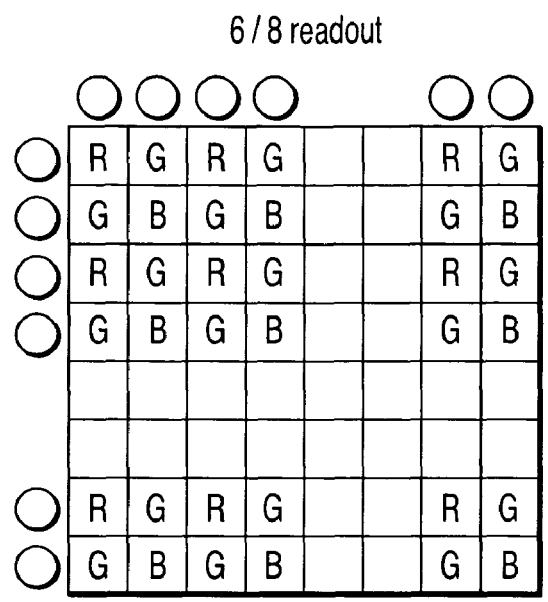
FIG. 5 is a view showing an example of thinning-out readout in which two of eight pixels are read out in each of a horizontal direction and a vertical direction.
Figure 6B:
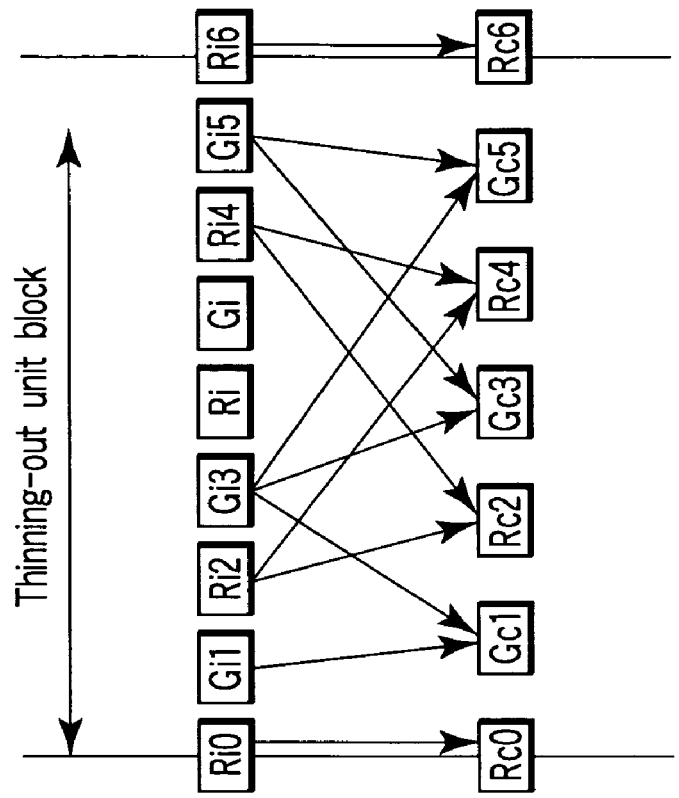
FIGS. 6A and 6B are conceptual views each showing a distortion correcting process.
Figure 6A:
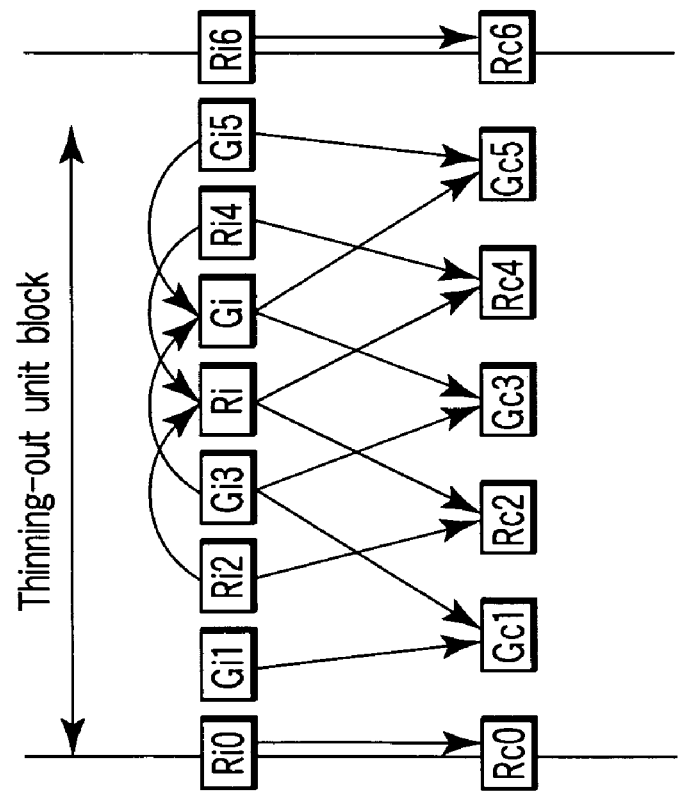

Now, a distortion correcting process for thinning-out readout will be described in detail. FIG. 5 shows an example of thinning-out readout in which two of eight pixels are read out in each of a horizontal direction and a vertical direction. A step is produced on an image in the readout method according to the example of FIG. 5. Therefore, as shown in FIG. 6A, let us consider an operation of padding a skipped pixel in accordance with linear interpolation using the peripheral pixels, thereby producing eight-pixel data, and changing the produced data to six-pixel data in accordance with linear interpolation. That is, as shown in FIG. 6B, a process for changing samplings at non-uniform pixel intervals to uniform samplings is carried out.

Figure 7:
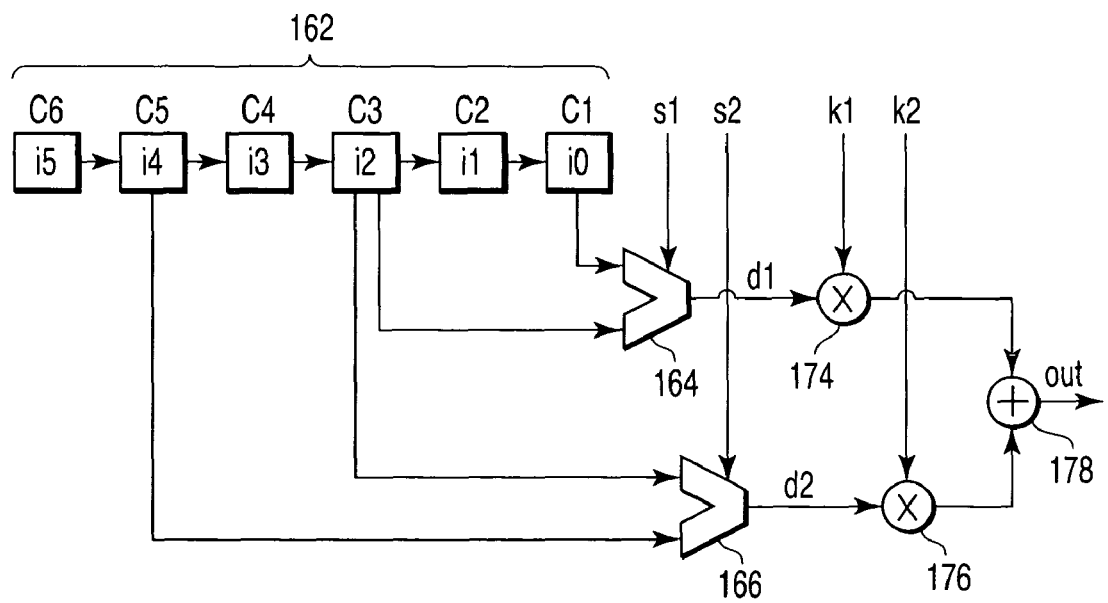
FIG. 7 is a diagram showing a pipeline configuration of the thinning-out readout process.

Here, let us consider readout of one line with thinning-out. FIG. 7 shows a pipeline configuration of the thinning-out readout process, wherein the pipeline configuration is composed of a shift register 162, a pair of selectors 164 and 166, a pair of multipliers 174 and 176, and an adder 178. The pixel positions read out with the top left shown in FIG. 5 being a reference are Ri0, Gi1, Ri2, Gi3, Ri4, Gi5, Ri6, and Gi7, and subsequently, repetition in the same rule is achieved. Matrix expression of distortion correction (change) in this example is obtained by:

$$\begin{pmatrix} Rc_0 \\ Gc_1 \\ Rc_2 \\ Gc_3 \\ Rc_4 \\ Gc_5 \end{pmatrix} = \begin{pmatrix} 1 & 0 & 0 & 0 & 0 & 0 \\ 0 & \frac{5}{6} & 0 & \frac{1}{6} & 0 & 0 \\ 0 & 0 & \frac{5}{6} & 0 & \frac{1}{6} & 0 \\ 0 & 0 & 0 & \frac{3}{4} & 0 & \frac{1}{4} \\ 0 & 0 & \frac{1}{6} & 0 & \frac{5}{6} & 0 \\ 0 & 0 & 0 & \frac{1}{12} & 0 & \frac{11}{12} \end{pmatrix} \begin{pmatrix} Ri_0 \\ Gi_1 \\ Ri_2 \\ Gi_3 \\ Ri_4 \\ Gi_5 \end{pmatrix} \quad (2)$$

In FIG. 7, the shift register 162 shifts maintained image data a one by one basis in a right direction every one operation that follows a clock. The selector 164 selects either of a first item and a third item from among five items of pixel data i0 to i5 adjacent thereto, the pixel data being maintained in the shift register 162. In addition, the selector 166 selects either of a third item and a fifth item from among five items of pixel data i0 to i5 adjacent to each other, the pixel data being maintained in the shift register 162 in accordance with a selection signal s2.

The multiplexer 174 multiplies a coefficient k1 of a weighted addition for an output d1 of the selector 164; the multiplier 176 multiplies a coefficient k2 of a weighted addition for an output d2 of the selector 166; and the adder 178 adds an output of a multiplier 194 and an output of a multiplexer 196.

FIG. 8 represents an operation (state transition) of a pipeline process at the filter processing section 142 shown in FIG. 4.

A pixel data train (i0, i1, i2, . . . ) supplied to the shift register 162 is shifted in the right direction every one operation that follows a clock while C1=i0, C2=i1, C3=i2, . . . are defined as an initial state. Concurrently, the selector 164 selects C1 when s1 is 0 (therefore, d1=C1 is obtained), and selects C3 when s1 is 1 (therefore, d1=C3 is obtained). On the other hand, the selector 166 selects C3 when s2 is 0, and selects C5 when s2 is 1 (therefore, d2=C5 is obtained).

In addition, in synchronism with a clock, the coefficient k1 and the coefficient k2 are supplied to the multiplexer 174 and the multiplexer 176, respectively, from the memory contained in the filter coefficient setting section 144 shown in FIG. 4. Therefore, out=k1×d1+k2×d2 is output from the adder 178.

As is evident from FIG. 8, a pipeline process including a pixel phase operation (selector switching) is carried out by carrying out shifting of serial data; selector switching in accordance with a state of s1 and s2; outputting the weight coefficients k1 and k2 in accordance with the thinning-out rule shown in formula (2); and a weighting additive computation in synchronism with each other.

The imaging apparatus according to the present embodiment assumes a case of a mobile image as an input image, so that an interlace operation interpolates pixel data which are missing each other between the two continuous frames so as to interpolate pixel data which are missing each other between two fields. For example, the readout phase control section 230 shifts a reference position of a range of the pixel data read out by the readout control section 224 such that image data in a plurality of continuous frames does not have these items of the entirely missing pixel data. It is preferable that a shift quantity be in order of two to eight pixels.

Figures 9A, 9B:
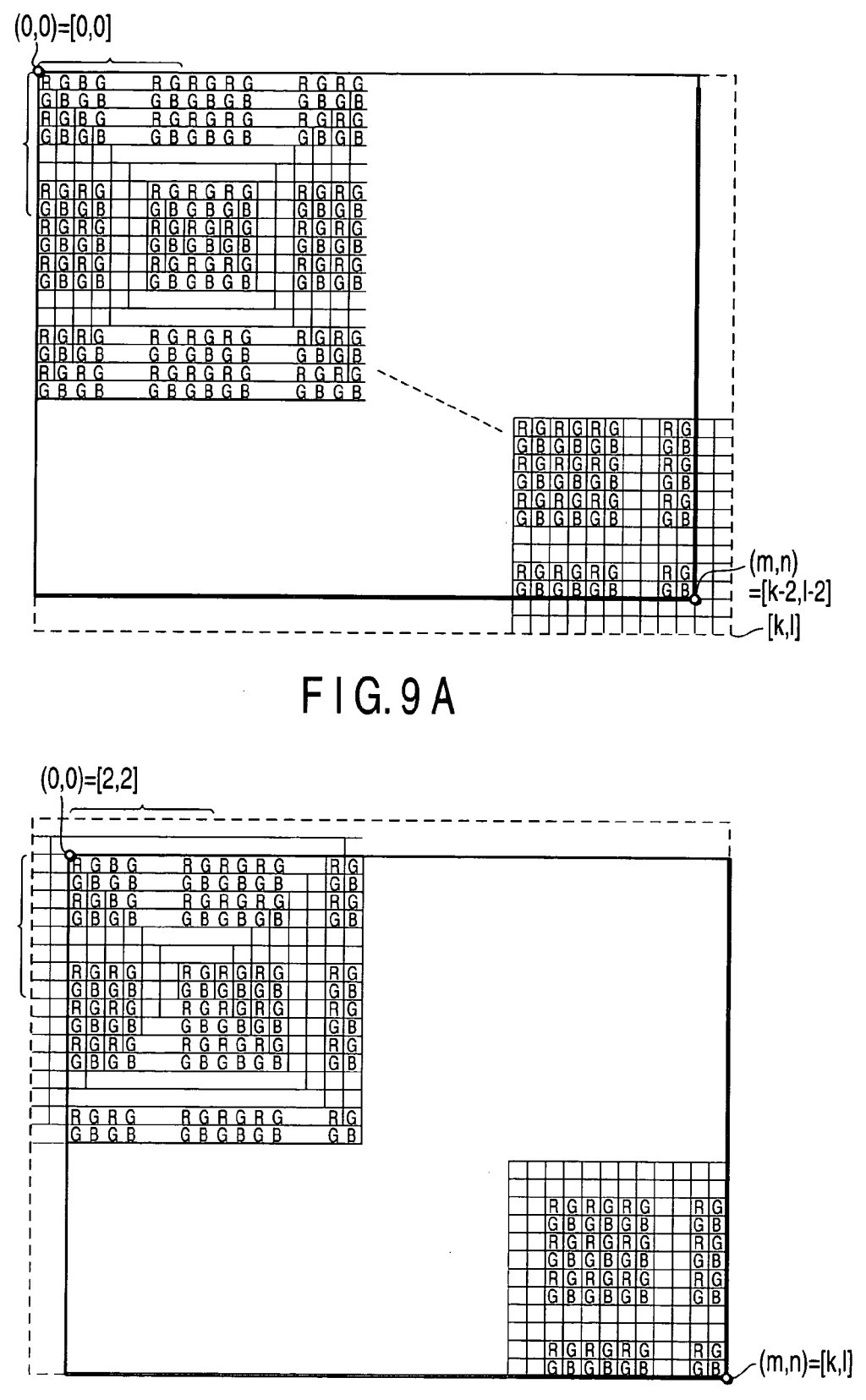

FIGS. 9A and 9B schematically show how a reference position is shifted within the readout range in repetitive readout of 6/8 thinning-out readout. In FIGS. 9A and 9B, [x, y] represents a pixel position of a pixel array of the photoelectric converting element 222 and (x, y) represents a pixel data array in the readout range.

As shown in FIGS. 9A and 9B, the number of pixels in the readout range of one frame are "k" pixels in a horizontal direction and "l" pixels in a vertical direction, respectively. Therefore, the position of the top left pixel can be represented as [0, 0], and the position of the bottom right pixel can be represented as [k, l]. In addition, the number of pixels in the readout range of one frame are "m" pixels in a horizontal direction and "n" pixels in a vertical direction, respectively. Therefore, the readout start position at the top left of the frame can be represented as (0, 0), and the readout end position at the bottom right thereof can be represented as (m, n). The readout range of the frame shown in FIG. 9B is shifted by +2 pixels in the horizontal direction and +2 pixels in the vertical direction with respect to the readout range of the frame shown in FIG. 9A.

In the frame shown in FIG. 9A, the top left readout start position (0, 0) coincides with the top left pixel position [0, 0] of the photoelectric converting element 222. Namely, $$(0,0)=[0,0] \quad (3)$$

is obtained. In addition, the readout end position (m, n) is:

$$(m,n)=[k-1, l-2] \quad (4)$$

On the other hand, in the frame shown in FIG. 9B, the top left readout start position is:

$$(0,0)=[2,2] \quad (5)$$

In addition, the readout end position is:

$$(m,n)=[k,l] \quad (6)$$

An image range selection processing section 240 selects a range common to the frame shown in FIG. 9A and the frame shown in FIG. 9B. That is, a range of a rectangle with (2, 2) and (m, n) being diagonal apexes is selected with respect to the frame shown in FIG. 9B, and a range of a rectangle with (0, 0) to (m−2, n−2) being diagonal apexes is selected with respect to the frame shown in FIG. 9A. The range selected by the image range selection processing section 240 always has (m−2)×(n−2) items of pixel data.

In addition, in consideration of a range to be cropped in advance, it is necessary to consider an image size and a phase shift component of an output for a total number of images read out from the imager 102. The image range selection processing section 240 changes a cropping range on the basis of information on the readout start position.

Frame memories 252, 254, and 256 are First-in First-out (FIFO) memories, and an inter-frame computation processing section 260 generates an output image by using the data contained in a first frame which are present in their frame memories 252, 254, and 256 and the pixels at the same positions in a second frame which is different from the first frame.

For example, in the case of two frames, a composite image out(i, j) is:

$$\text{out}(i,j)=0.51(k,i,j)+0.51(k-1,i,j) \quad (7)$$

Here, i, j represents a pixel position, and l(k, i, j) denotes intensity of an image signal at the pixel positions i, j of a k-th frame.

In addition, in the case of three frames, a composite image out(i, j) is obtained as follows by using a weighted component:

$$\text{out}(i,j)=0.251(k,i,j)+0.51(k-1,i,j)+0.251(k-2,i,j) \quad (8)$$

Image data read out in the readout rules different from between a plurality of frames, and with respect to the image data being subjected to a distortion correction filter process, a position shift of an image between frames is corrected by the image range selection processing section 240. Data for a predetermined frame is accumulated by, the frame memories 252, 254, and 256; inter-frame computation is carried out by the inter-frame computation processing section 260; and predetermined processing operation is carried out by an image signal processing section 152. Then, data is output to an image display section 154 and an image recording section 156. By carrying out inter-frame interpolation, an image smoothing effect using a low path can be obtained in addition to advantage effect of distortion correction.

Figure 10:
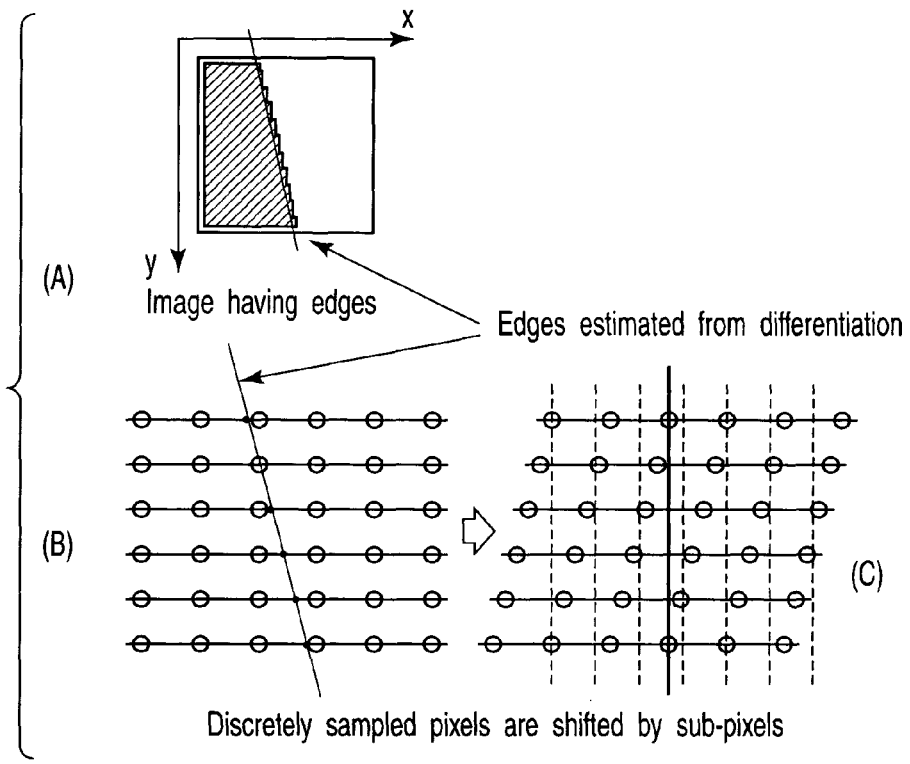
FIG. 10 is a view for explaining a principle of a spatial frequency response (SFR) which is used when evaluating resolution of a digital image.

FIGS. 10(A) to (C) are views for explaining a principle of a spatial frequency response (SFR) used for evaluating resolution of a digital image. First, an image having a known tilt as shown in FIG. 10(A) is prepared. A position of this edge is applied to discretely sampled pixels as shown in FIG. 10(B). Then, a lattice position is shifted to a state in which the edge is erected while the position of the edge (FIG. 10(C)) is defined as a reference, so that it is possible to indicate a response of data obtained at the sampling intervals in the case where it is assumed that an ideal edge has been present. In accordance with such a method, it is possible to evaluate spatial frequency response characteristics up to a frequency which is higher than a frequency corresponding to the lattice intervals of the digital image.

Figure 11:
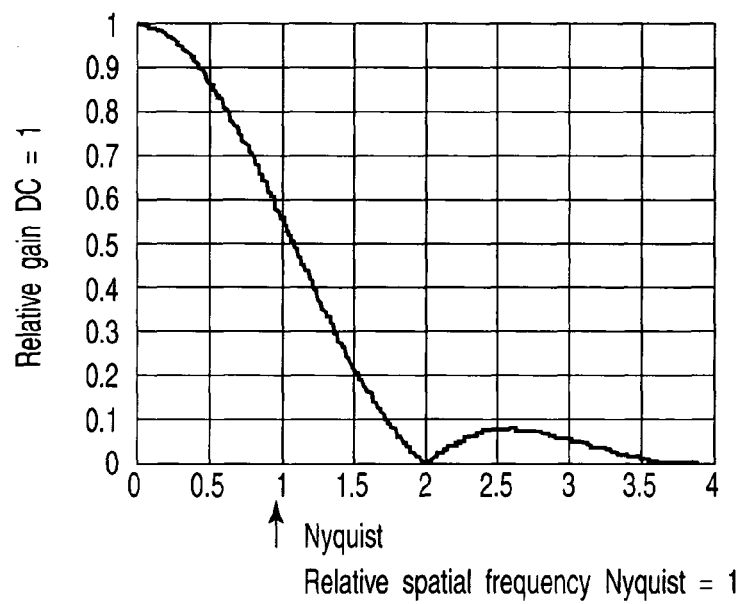
FIG. 11 is a view showing an example of a spatial frequency response measured by the SFR.

FIG. 11 shows an example of a spatial frequency response measured by means of the SFR. The horizontal axis denotes a relative spatial frequency standardized by defining as 1 a Nyquist frequency obtained in the case where pixels of an image are defined as a sampling unit, and the vertical axis denotes a relative gain of a spatial frequency response standardized while a response of CD is defined as 1. A gain at a Nyquist frequency can be used as an evaluation value of the resolution of a digital image. Of course, although another frequency can be used as a reference, the effective range is in order of 1/3 to 1 times of the Nyquist frequency.

Figure 12:
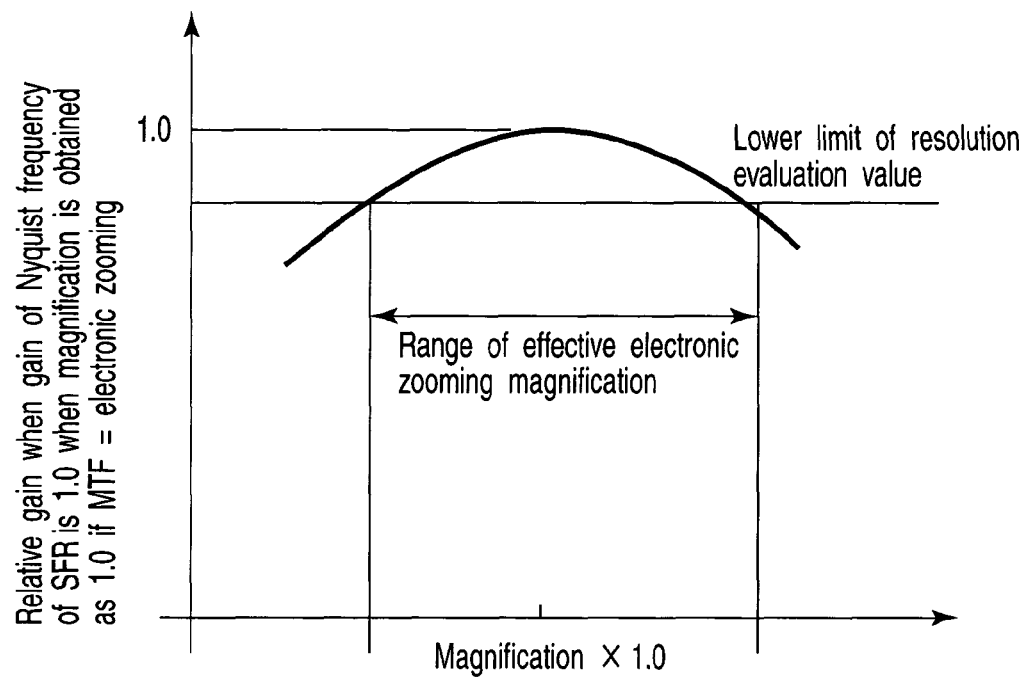
FIG. 12 is a view showing a change of the resolution obtained when a magnification changing operation has been made by means of electronic zooming as shown in FIGS. 2 and 3 by using a gain at a Nyquist frequency as shown in FIG. 11 as an evaluation value of resolution.

FIG. 12 shows a change of resolution when a magnification changing operation using electrical zooming as shown in FIGS. 2A to 2C and 3 has been made, by using a gain at a Nyquist frequency as an evaluation value of resolution. Here, the evaluation value of the resolution of ×1 in which no magnification changing operation is made is standardized as 1. By carrying out evaluation of such resolution, it is possible to set a lower limit of a predetermined resolution evaluation value and to set a range of an effective electrical zoom magnification for obtaining a desired resolution or more.

Figure 13:
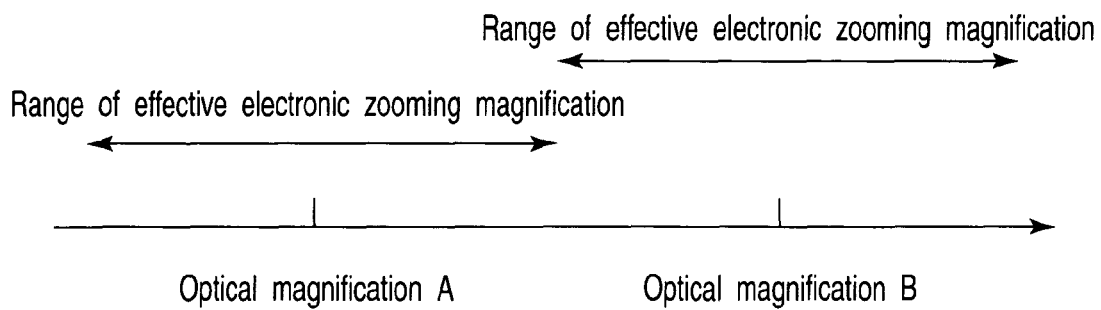
FIG. 13 is a view showing two discrete optical magnifications A and B as compared with a range of the electronic magnifications shown in FIG. 5.

FIG. 13 is a view showing two discrete optical magnifications A and B as compared with a range of the electronic magnification shown in FIG. 5. By using the reference of resolution shown in FIG. 11, an effective magnification for electronic zooming is set within the range from 0.75 to 1.2, and the steps are provided in order of ×0.5.

0.75/0.8/0.85/0.9/0.95/1.0/1.05/1.1/1.15/1.2

In contrast, when the magnification of optical zooming having a two-group configuration is designed as ×1 and ×1.7, the following magnifications are achieved by using optical zooming and electronic zooming altogether.

Optical zoom ×1:
0.75/0.8/0.85/0.9/0.95/1.0/1.05/1.1/1.15/1.2
Optical magnification ×1.7:
1.275/1.36/1.45/1.53/1.62/1.7/1.79/1.87/1.96/2.04

Therefore, there is provided an imaging apparatus, wherein a comprehensive magnification has a zoom magnification from ×0.75 to ×2.04, and the number of magnification steps is 20.

Figure 14:
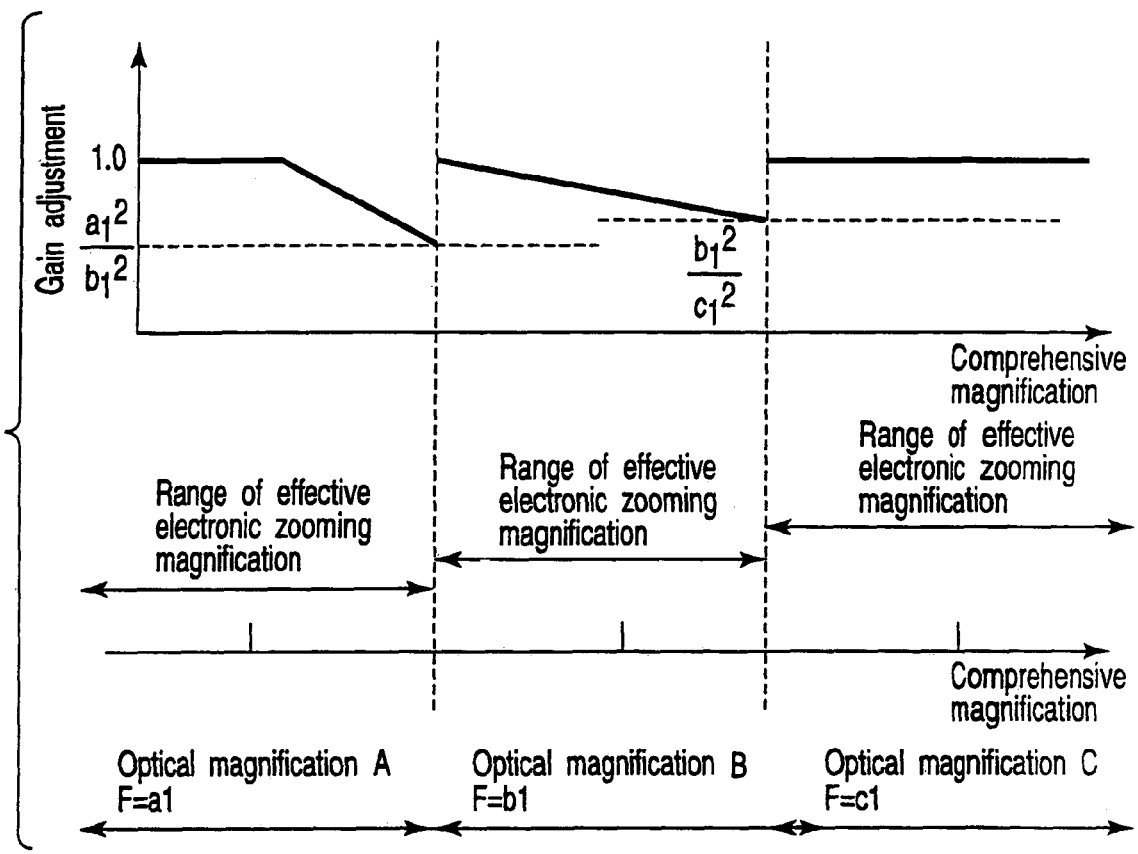
FIG. 14 is a view showing how gain adjustment is made in a magnification obtained in a combination between optical zooming and electronic zooming.

FIG. 14 shows how gain adjustment is carried out by the gain adjustment section 110 shown in FIG. 1 in order to compensate for a fluctuation of an F value caused by a magnification change of optical zooming at the time of a magnification switching. Assuming that there are magnifications A, B, and C, and that the respective release f value is $a1 \geq b1 \geq c1$, the brightness is obtained as $a_1^2/b_1^2$ times by means of a magnification switching of A→B, and thus, a gain is adjusted so as to naturally make connection to this brightness. Similarly, in a magnification switching of B→C, the brightness is obtained as $b_1^2/c_1^2$ times, gain adjustment is made so as to compensate for this. Where an optical magnification C is obtained, there is no need for making connection to a magnification at which the F value is lower than the above magnification, and thus, the gain is kept constant as is.

In this way, even if resolution compensation is carried out by means of a combination of optical zooming and the expansion and reduction electronic zooming, a step of the resolution slightly remains before and after a magnification switching. Therefore, a switch point of optical zooming is changed by W (wide)→T (Telephoto), and T→W such that a switch point reaches before target framing.

Figure 15:
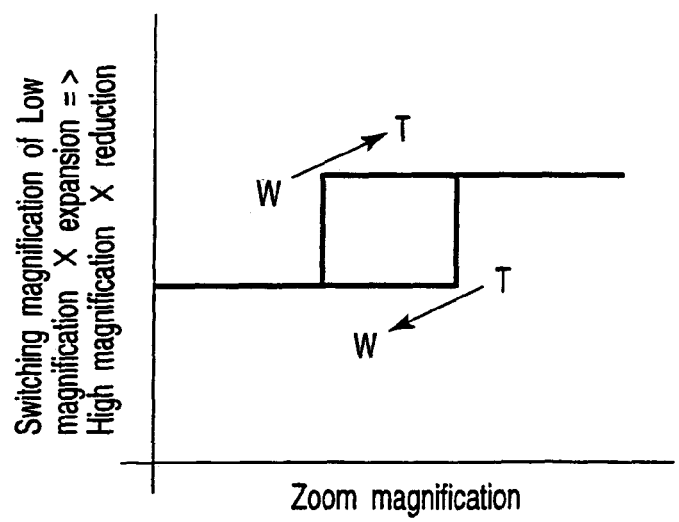
FIG. 15 is a view showing how an optical zooming switching point is changed in W→T or T>W.

FIG. 15 shows how such change is made. In W→T, a magnification is changed to a high magnification optical system at a low magnification. In T→W, a magnification is changed to a wide-angle optical system at a high magnification. In the present embodiment, an optical zooming switch point is changed by W→T and T→W. Thus, switching of optical zooming terminates before target framing has been reached, thereby making it possible to reduce the feeling of a resolution step.

Figure 18:
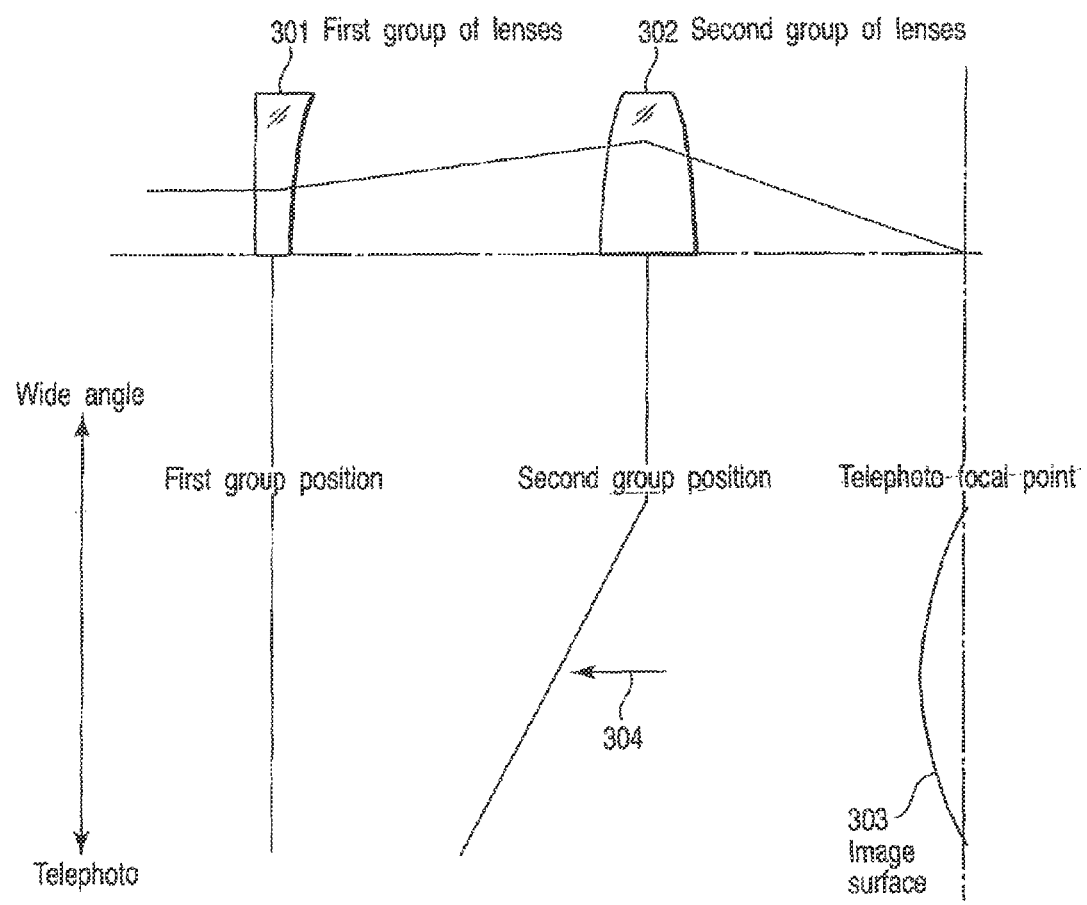
FIG. 18 is a view showing an optical system having a two-group configuration in which a first group of lenses 301 is negative and a second group of lenses 302 is positive, only the second group of lenses 302 at an image side being movable.

As shown in FIG. 18 or FIG. 19, zooming at a number of magnifications can be carried out in combination with electronic zooming by using an optical zooming mechanism having an optical disposition with discrete magnifications and having a structure of a mirror body. Further, a design of an electronic zooming magnification range and optical zooming is made such that a reference of resolution is compensated for, thereby making it possible to provide an imaging apparatus comprising two magnification changing systems, wherein a resolution is compensated for.

Figure 16:
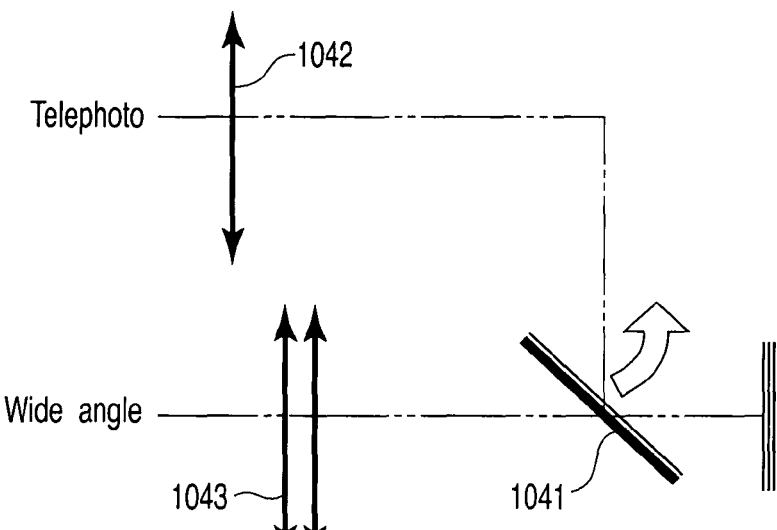
FIG. 16 is a view showing a configuration of switching optical paths of a telephoto lens system 1042 and a wide angle lens system 1043 by means of a mirror 1041.

Moreover, a method of changing a focal distance in a stepwise manner includes a method for changing a lens system configuration. As shown in FIG. 16, optical paths of a telephoto lens system 1042 and a wide angle lens system 1043 are switched by using a mirror 1041.

Figure 17:
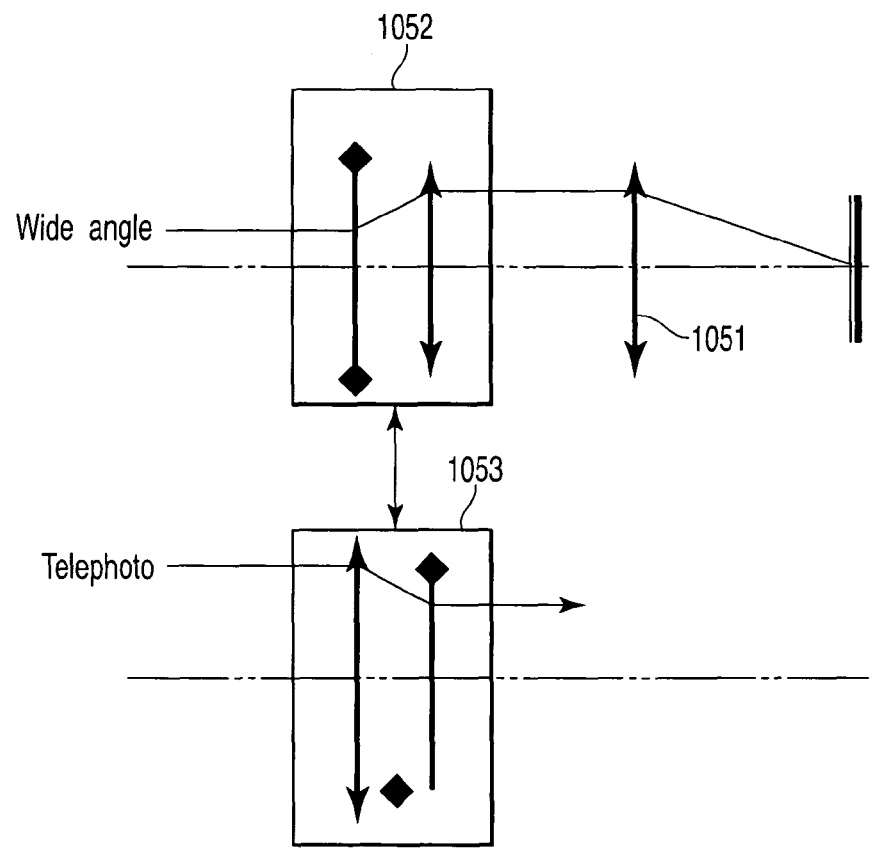
FIG. 17 is a view showing a configuration of switching a wide angle lens 1052 having a negative and positive two-group configuration and a telephoto lens 1053 having a positive and negative two-group configuration with respect to a master lens 1051.

Similarly, in a relay lens system as shown in FIG. 17, a wide angle and a telephoto view can be achieved by inserting into an optical path a wide angle lens 1052 having a negative and positive two-group configuration and a telephoto lens 1053 having a positive and negative two-group configuration in a substitutive manner with respect to a master lens 1051. In FIG. 17, substantial parallel luminous fluxes are produced between the two-group focusing lens and the master lens.

What is claimed is:

1. An imaging apparatus having an imaging element which converts an optically formed image to an electrical signal by means of photoelectric conversion, thereby acquiring image data, the imaging apparatus comprising:
    an optical magnification changing mechanism which optically changes a magnification of an image by switching an optical magnification between W and T (W<T) by a switching mechanism;
    an electronic magnification changing mechanism which reduces or expands the magnification of the image by signal processing; and
    a gain adjustment section which calculates and adjusts a gain of an electronic signal of the image to compensate for a change in brightness of the image due to a change in F value caused by the switching of the optical magnification between W and T by the optical magnification changing mechanism.

2. An imaging apparatus according to claim 1, wherein the electronic magnification changing mechanism has an allowable range defined by an upper limit and a lower limit of a magnification specified by a resolution of an image.

3. An imaging apparatus according to claim 2, wherein, assuming that the allowable range of the electronic magnification changing mechanism is Z1 to Z2 (Z1<1.0<Z2) and a magnification in the vicinity of an actual switching magnification is Z3 or Z4 (Z1≦Z3<1.0<Z4<Z2), a resolution obtained by W×Z4 and a resolution obtained by T×Z3 are within a range of a predetermined difference with respect to the two magnifications W and T.

4. An imaging apparatus according to claim 1, wherein the switching mechanism changes a magnification of an image switching in response to a change rate when a magnification change is specified.

5. An imaging apparatus according to claim 1, wherein the switching mechanism optically changes a magnification of an image switching in response to a change direction when a magnification change is specified.

6. An imaging apparatus according to claim 1, wherein a reference of a resolution for specifying a range of magnifications of the electronic magnification changing mechanism is based on a spatial frequency response (SFR), and the reference of the resolution is obtained as a relative value standardized by an SFR value in a case where no process using the electronic magnification changing mechanism has been carried out.

7. An imaging apparatus according to claim 1, wherein an interval of the magnifications of the optical magnification changing mechanism is set such that a resolution of an image generated by using the optical magnification changing mechanism and the electronic magnification changing mechanism is obtained as a reference value or more.

8. An imaging apparatus according to claim 1, wherein the electronic magnification changing mechanism: (i) carries out an interpolating process such that the number of pixels is increased with respect to a predetermined region of image data read out during an expanding process; (ii) discretely samples a wide region as compared with a readout region obtained by sampling provided in the case where no magnification change is made during a reducing process; and (iii) converts current data to predetermined image data in accordance with a correcting process.

9. An imaging apparatus according to claim 1, wherein a total number of pixels read out from the imaging element for expanding the magnification using the electronic magnification changing mechanism and a total number of pixels read out from the imaging element for reducing the magnification using the electronic magnification changing mechanism are constant.

10. An imaging apparatus according to claim 1, wherein the optical magnification changing mechanism discretely changes the magnification of the image by a mechanism which switches part of an optical path.

11. An imaging apparatus according to claim 1, wherein the optical magnification changing mechanism makes a stepwise zooming operation and a focusing operation by means of a cam mechanism having a region for magnification change and a region for focusing.

12. An imaging apparatus according to claim 1, wherein the switching mechanism switches between (i) obtaining the image with the optical magnification W and applying an expansion conversion by the electronic magnification changing mechanism and (ii) obtaining the image with the optical magnification T and applying a reducing conversion with the electronic magnification changing mechanism.

* * * * *